United States Patent
Cheng

(10) Patent No.: US 6,243,804 B1
(45) Date of Patent: Jun. 5, 2001

(54) SINGLE CYCLE TRANSITION PIPELINE PROCESSING USING SHADOW REGISTERS

(75) Inventor: Chuck Cheuk-wing Cheng, Saratoga, CA (US)

(73) Assignee: Scenix Semiconductor, Inc., Santa Clara, CA (US)

( * ) Notice: Subject to any disclaimer, the term of this patent is extended or adjusted under 35 U.S.C. 154(b) by 0 days.

(21) Appl. No.: 09/121,201

(22) Filed: Jul. 22, 1998

(51) Int. Cl.[7] .................................................. G06F 9/48
(52) U.S. Cl. ..................... 712/228; 709/108; 710/260; 712/229; 712/244
(58) Field of Search .................... 710/260; 712/228, 712/229, 244; 709/108

(56) References Cited

U.S. PATENT DOCUMENTS

| 5,327,566 | * | 7/1994 | Forsyth | 710/260 |
| 5,386,563 | * | 1/1995 | Thomas | 712/228 |
| 5,530,873 | * | 6/1996 | Takano | 710/260 |
| 5,615,375 | * | 3/1997 | Ibusuki et al. | 710/264 |
| 5,642,516 | * | 6/1997 | Hedayat et al. | 710/260 |
| 5,812,868 | * | 9/1998 | Moyer et al. | 712/23 |
| 5,987,258 | * | 11/1999 | Daniel et al. | 717/9 |

\* cited by examiner

Primary Examiner—Kenneth S. Kim
(74) Attorney, Agent, or Firm—Fenwick & West LLP

(57) ABSTRACT

A system and method for efficiently handling interrupts in a microcontroller environment is disclosed. An interrupt handling circuit preserves a current state of a microcontroller comprising a plurality of primary registers for storing information relating to the current state of the microcontroller and a plurality of shadow registers coupled to at least two of the primary registers for storing the information contained in the coupled primary registers in response to receiving an interrupt enter signal from an interrupt signal generator. In one embodiment the information relating to the current state of the microcontroller includes the program counter, accumulator data, CPU status data, and an address pointer to data memory. In a preferred embodiment, the information is restored to the primary registers within one clock cycle of receiving an interrupt exit signal from the interrupt signal generator. In a pipeline stage embodiment a sequence of interrupt instructions is fed into the pipeline in subsequent clock cycles after the data is stored in the shadow registers, facilitating a rapid response to the interrupt.

4 Claims, 7 Drawing Sheets

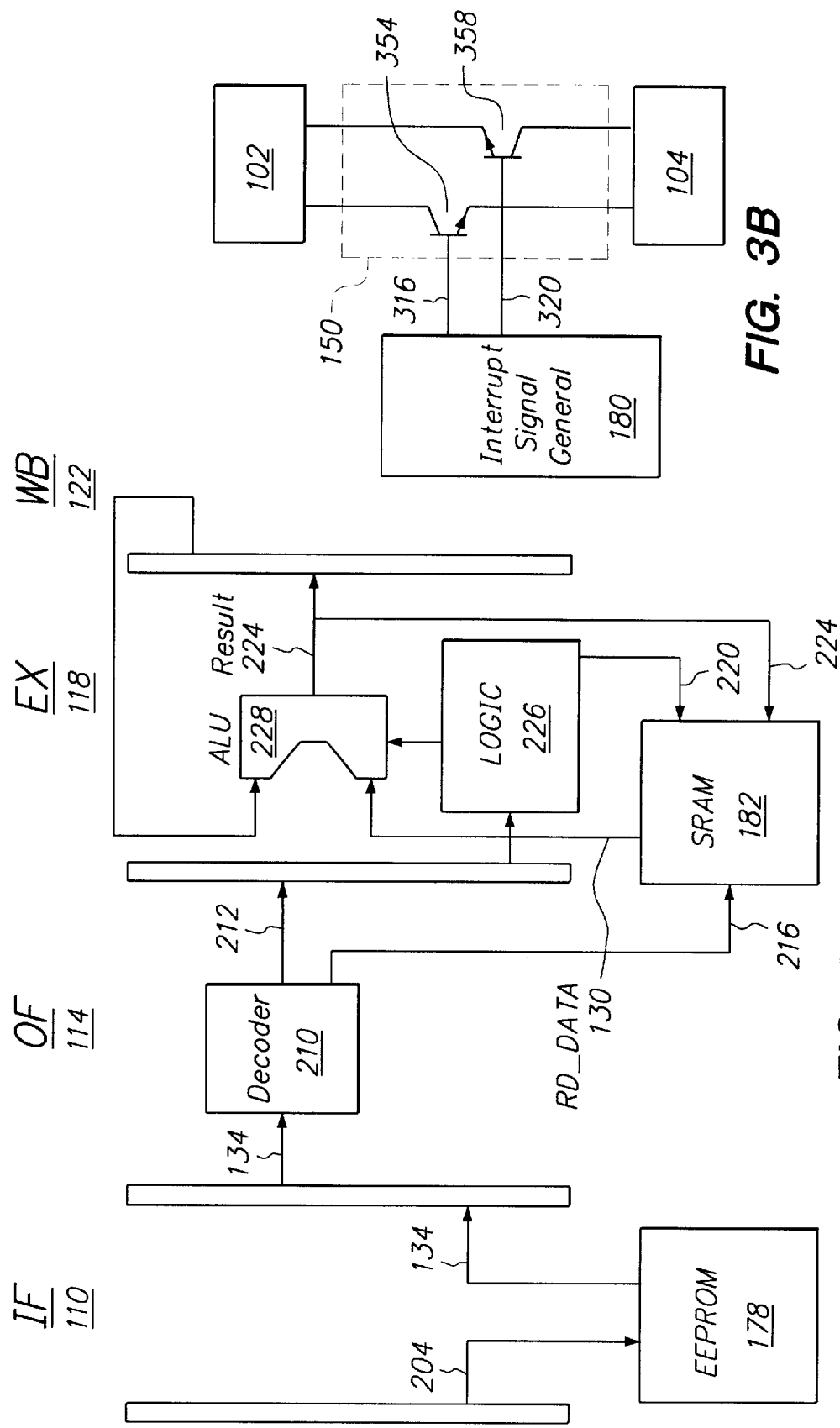

FIG. 6

```
;Interrupt Service Routine (ISR) entry (Program counter, W, STATUS,
;and FSR are saved) always begins at address 000
;
intentry
        $ISR_0$           ; Main Code of ISR
                          ; No need to save the W, STATUS, and FSR
        $ISR_1$           ; Intruction following $ISR_0$
        $ISR_2$           ; Intruction following $ISR_1$
          .               ; Other instructions of the ISR main code
          .               ; "
          .               ; "
          .               ; "
        $ISR_n$           ; Last Intruction of the main code of ISR
        RETI              ; Return from interrupt
        $AISR_0$          ; First instruction located physically after ISR
        $AISR_1$          ; Second instruction located physically after ISR
          .               ; Other instructions after ISR
          .               ; "
          .               ; "
          .               ;
;Main Program
;
Main
        $I_0$             ;
        $I_1$             ; Main Program instruction got interrupted
        $I_2$             ; Instruction following $I_1$, this instruction is not
                          ; executed and forced to be No Operation
                          ; (NOP)
        $I_3$             ; Instruction following $I_2$, this instruction is also
                          ; forced to be NOP
          .               ; Other instructions of the main program
          .               ; "
          .               ; "
          .               ;
    RESET VECTOR          ; End of program
```

SINGLE CYCLE TRANSITION PIPELINE PROCESSING USING SHADOW REGISTERS

BACKGROUND OF THE INVENTION

1. Field of the Invention

The invention relates to the field of computer microcontrollers and more particularly to the field of interrupt handling in a microcontroller environment.

2. Description of Background Art

Microcontrollers are microprocessors integrated with peripherals on a single integrated circuit. They are compact in size and yet retain the computational power of traditional microprocessors, allowing them to be used in a multitude of applications. For example, in a single household, microcontrollers are a part of microwave ovens, televisions, calculators, remote controls, clocks, etc. In a microwave oven, for example, the microcontroller senses the settings keyed in by the user and heats up the food for the set time interval and power level. The microcontroller keeps track of real time and produces a beep to notify the user when the heating is done. The microcontroller also displays the status of the microwave oven on a suitable display, typically an LCD or LED.

Every car has about twenty microcontrollers. In a car, they are used in the engine control modules, the antilock braking systems, the sound systems, the airbags, and automobile suspension control modules. In antilock braking systems, the microcontroller monitors the rotational speed of the tires through sensors attached to the tires. When the driver applies the brakes, the microcontroller determines whether any of the tires have locked. If any of the tires are locked, the microcontroller releases the brakes for that tire through a servo-mechanical device coupled to the brakes. Thus, the driver is able to steer the car during emergency braking situations without fear of having the tires lock and causing the car to skid or turn over.

A modem semiconductor microcontroller is basically a low-cost computer adapted to provide rapid solutions to external events after intensive computation. The microcontroller senses the happening of external events through signals received at input ports, and transmits responses to the events through its output ports. In order to provide this functionality, a typical microcontroller employs an on-chip Programmable Read Only Memory (PROM) to store its instructions, an on-chip data RAM to store the data temporarily, a Central Processing Unit (CPU) to execute the instructions stored in the PROM, an oscillator driver to generate the system clock, and other application-specific peripherals such as timers, interrupt handlers, watchdogs, analog comparators, etc.

If important events occur during the execution of the normal flow of program, the microcontroller must be able to respond quickly. In the microwave oven example, if a metal container is placed within the oven and the oven begins heating, the microcontroller must interrupt the heating before the metal container causes sparks or a fire in the oven. In the antilock braking example, applying the brakes interrupts the monitoring function of the microcontroller and forces it to immediately determine whether any of the tires have locked. As can be seen, an important design criterion for microcontrollers is the ability of the microcontroller to respond to external events as quickly as possible.

An interrupt mechanism is implemented in modern 8-bit ALU microcontrollers to provide a means for departing from the normal flow of program execution in response to an external event. In conventional systems, the interrupt logic of the microcontroller temporarily stops the normal flow of program execution and causes a separate interrupt service routine to be executed. After the interrupt has been serviced, execution continues with the next instruction in the main program that would normally have been executed following the point of interruption. In order to continue normal execution of the main program, however, certain critical data regarding the state of the microcontroller prior to servicing the interrupt routine must be known.

Conventional microcontroller interrupt handling designs use program code to save and retrieve the current state of the microcontroller to and from memory. The use of this code requires critical bandwidth to execute, slowing down interrupt response and recovery time. Additionally, this design requires the use of extra RAM registers to store the state information while the interrupt routine is being executed.

Below is an example of code currently required to initiate an interrupt service routine:

```
; Interrupt Service routine entry
                        ; Interrupt entry, save context
intentry
movwfwsave              ; Save the W register into WSAVE
movf status, 0          ; Save the STATUS register into W
movwfstatussave         ; Move from W into STATUSSAVE
                        ; (Z flag was affected, but after STATUS read)
movf fsr, 0             ; Save the FSR register into W
movwffsrsave            ; Move from W into FSRSAVE
(MAIN CODE)             ; Main interrupt code which affects W, STATUS,
                        ; and FSR
                        ; Get ready to exit Interrupt Service routine,
                        ; restore context
movf fsrsave, 0         ; Move FSRSAVE into W
movwffsr                ; Restore FSR from W
movf statussave, 0      ; Move STATUSSAVE into W
movwfstatus             ; Restore STATUS from W
swapf wsave, 1          ; Swap WSAVE so that it can be un-swapped
swapf wsave, 0          ; Move data back into W without affecting
                        ; STATUS's Z flag
reti                    ; return from interrupt (program counter is restored)
```

Executing the above code may take thirty to forty clock cycles, making conventional microcontrollers ineffective when external events require immediate responses. Thus, there is needed a system and method for quickly and efficiently handling interrupts in a microcontroller environment which does not require the use of expensive memory.

SUMMARY OF THE INVENTION

The invention is a system and method for efficiently handling interrupts in a microcontroller environment. An interrupt handling circuit is disclosed for preserving a current state of a microcontroller comprising a plurality of primary registers for storing information relating to the current state of the microcontroller and a plurality of shadow registers coupled to at least two of the primary registers for storing the information contained in the coupled primary registers in response to receiving an interrupt signal. Conditional control logic is used to control the transfer of data responsive to the state of the interrupt signal. The information relating to the current state of the microcontroller preferably includes the program counter, accumulator data, CPU status data, and an address pointer to a portion of data memory. The critical information is stored and retrieved quickly, each operation occurring within a single clock cycle. As the interrupt service routine no longer needs to save and retrieve the critical data to and from memory, as in conventional systems, the interrupt service routine is able to immediately execute event-handling instructions and is able to more quickly return control to the main program. Thus, the microcontroller's response time to external events is greatly shortened. In a further embodiment, a second set of shadow registers is employed to allow multiple copies of the critical data to be stored, for example, in response to an interrupt generated from debugging circuitry while the main program has already been interrupted.

BRIEF DESCRIPTION OF THE DRAWINGS

FIG. 2 is a block diagram of the four pipeline stages of the microcontroller of FIG. 1.

FIG. 3b is an exploded view of an embodiment of the condition control logic.

FIG. 6 illustrates an interrupt service routine according to one embodiment of the present invention.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digits of each reference number corresponds to the figure in which the reference number is first used.

Figure 1:
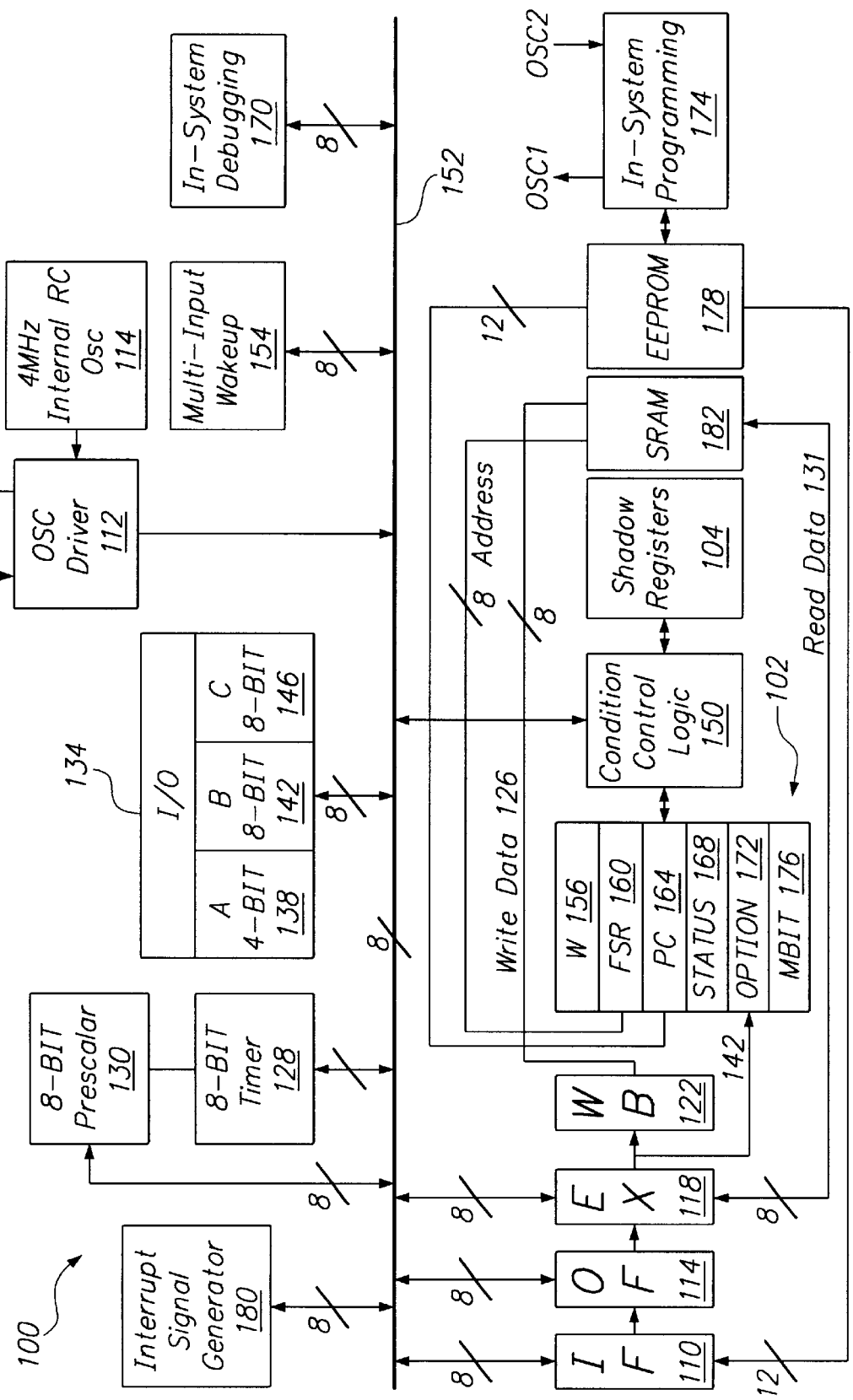
FIG. 1 is a block diagram of a microcontroller according to one embodiment of the present invention.

FIG. 1 illustrates one embodiment of a microcontroller 100 according to the present invention. An oscillator driver 112 (OSC) is coupled to an external reference to provide a system clock for the microcontroller 100. The external references are typically crystal oscillators, resonators, or resistors and capacitors depending on the oscillation mode chosen. OSC 112 also distributes a 4 MHz clock generated by the 4 MHz Internal RC (Resistor & Capacitor) Oscillator 114, when this frequency is required. The output of OSC 112 is coupled to a main bus 152 for distribution to the other components of the microcontroller 100.

An interrupt signal generator 180 generates and responds to interrupts. The interrupt signal generator 180 is a logic circuit designed on chip to perform the conventional interrupt handling functions of the microcontroller 100. Upon receiving an interrupt request, the interrupt signal generator 180 stops the normal execution of a program, and stores the return address to the breakpoint of the main program into the interrupt stack. Then, the interrupt signal generator 180 initiates the interrupt service subroutine (ISR) stored in program memory 178, described below. The interrupt signal generator 180 also generates an interrupt enter signal in response to initiating the interrupt service routine which is transmitted to the conditional control logic 150, described below. Upon completing the ISR, the interrupt signal generator 180 initiates the resumption of the execution of the main program. The interrupt signal generator 180 generates an interrupt exit signal upon completing the ISR, which is also transmitted to the conditional control logic 150.

Various components of the microcontroller 100 may be sources for causing the interrupt signal generator 180 to generate an interrupt. The 8-bit timer (TMR) 128 causes an interrupt upon timing down and is available for any general purpose. Thus, programs which provide for interrupts may use TMR 128 to generate an interrupt signal a certain amount of time after an event occurs. An 8-bit prescalar 130 is coupled to TMR 128 and divides the clock signal by a set number before passing the clock signal to TMR 128.

The I/O port 134 has three individual ports A, B, and C. These ports 138, 142, 146 are general-purpose input/output ports. Port A 138 is 4 bits wide while Port B 142 and Port C 146 are 8 bits wide. Each pin of the ports 138, 142, 146 may be set to receive data or transmit data. The Multi-input Wakeup circuit 154 samples the transition of the pins of Port B 142. If an interrupt is enabled and the microcontroller 100 is not in SLEEP mode, an edge transition at Port B 142 causes an interrupt. This allows external components to cause an interrupt to the microcontroller 100. If the microcontroller 100 is in SLEEP mode, however, the transition wakes up the microcontroller 100.

An In-System debugging circuit 170 (ISD) interfaces with an external debugging system, and is a third mechanism for generating interrupts. Responsive to the commands ISD 170 receives from the external debugging system, ISD 170 inserts breakpoints, reads and writes internal microcontroller registers, and performs single-step iterations through routines. At the inserted breakpoints, ISD 170 may request interrupts to be generated.

The remaining circuits in FIG. 1 perform the processing of the microcontroller 100, as well as the remaining interrupt handling functions. In-System programming circuit 174 (ISP) interfaces with external programmers. Through the clock pins OSC1 and OSC2, ISP 174 communicates with the outside world serially. Responsive to the commands ISP 174 receives from external programmers, ISP 174 erases, programs or reads the Electrical Erasable Programmable Read Only Memory 178 (EEPROM) program memory. The ISP 174 allows the microcontroller 100 to be programmed even when the ISP 174 is already soldered and installed in the final end-user system.

The 2k×12 EEPROM 178 is used as program memory and is typically non-volatile semiconductor storage cells for storing program instructions, typically 12 bit wide, for the microcontroller 100. For example, the interrupt service routine is stored in EEPROM 78. The EEPROM 178 monitors changes in the PC address. If any bit of the 12 bit PC address pointer changes value, the EEPROM 178 powers up and outputs the instruction pointed to by the new PC address. Otherwise, the EEPROM 178 stays powered down.

The 136×8 Static Random Access Memory 182 (SRAM) is addressable data space. The SRAM 182 is a synchronous RAM and samples the control signals Read 131 (RD) and Write 126 (WE) at the rising edge of the system clock (CLK). When SRAM 182 senses either WE 126 or RD 131 or both are active, the SRAM 182 performs either a Write Operation or a Read Operation or both. The SRAM 182 functions as the register file for the microcontroller 100 and stores the temporary data.

The microcontroller 100 uses special primary registers 102 for storing critical microcontroller status data regarding the current state of the microcontroller 100. These primary registers 102 allow the microcontroller 100 to store the critical information on chip. Program Counter 164 (PC), Accumulator 156 (W), CPU status register 168 (STATUS), and data memory address pointer 160 (FSR) are four such primary registers 102 used by the microcontroller 100. W 156 is used by many instructions as one of the operands. FSR 160 stores the SRAM address pointer information. PC 164 is the program counter and is used to point at the next instruction to be fetched. STATUS 168 is a status register indicating the current status of the microcontroller's processing and the peripherals. Other primary registers include OPTION 172, which is a control register used to configure the microcontroller, and MBIT 176, which is a commonly used temporary register. The primary registers 102 together store the data used to resume normal operation of a main program after receiving an interrupt. The data within the primary registers 102 should be stored at the time of interrupt because during the execution of the interrupt service routine, new data is written to those registers 102.

Thus, in order to preserve the state of the microcontroller 100 prior to the interrupt being executed, the data contained within some or all of the primary registers 102 must be saved.

Condition control logic 150 is coupled to the primary registers 102 and the bus 152. Shadow registers 104 are coupled to several of the primary registers 102 through condition control logic 150. Condition control logic 150 stores the values in selected primary registers 102 into corresponding shadow registers 104 in response to receiving an interrupt enter signal from the interrupt signal generator 180. Condition control logic 150 restores the values of the selected primary registers 102 from the corresponding shadow registers 104 responsive to receiving an interrupt exit signal from the interrupt signal generator 180. Thus, important microcontroller status data is automatically saved and restored on chip, with minimal delay. Greater details of the interrupt handling circuitry are given below.

The pipeline stages 110, 114, 118, 122 of the microcontroller 100 are coupled to SRAM 182 and EEPROM 78. In this embodiment, there are four stages: Instruction Fetch 110 (IF), Operand Fetch 114 (OF), Execution 118 (EX) and Write Back 122 (WB). The interrupt handling circuit of the present invention may be used with a microcontroller operating in the above configuration, or other configurations such as having a different number of pipeline stages, generating interrupts under different conditions, using different clocks or references, or using different types of memory, with equal effectiveness.

In FIG. 2, the pipeline is shown in more detail. The IF stage 110 accesses the EEPROM 178 using the address 204 given by the PC 164 to fetch the next instruction to be executed. The IF stage 110 transmits the instruction word 134 to the OF stage 114 on the next system clock rising edge. The OF stage 114 performs a preliminary decoding of the instruction word 134 using a decoder 210 and transmits the decoded signals 212 to the EX stage 118. Responsive to the results of decoding, the OF stage 114 begins any time-consuming operations, such as reading data from data memory 182. Other operations are decoded prior to being transmitted to the EX stage 118, including writing to memory, performing ALU operations, receiving or transmitting data through the input/output ports, or changing status flags. Each instruction word 134 is decoded into tens of control signals and each of these control signals enables a specific task. Since this pre-decoding reduces the time required to fully decode the instruction in the EX stage 118, the EX stage 118 has more time to perform the actual operation. The OF stage also generates the read address and RD signal 216 to set up the read operations to SRAM 182.

The EX stage 118 has an arithmetic logic unit (ALU) 228 inside and performs all of the ALU operations. ALU operations include addition, subtraction, shift-left, shift-right, etc. Also, the EX stage 118 generates the write address and WE signal 220 to set up the write operation to SRAM 182. The EX stage 118 also writes the results 224 of the ALU calculations to flip-flop based registers such as W 156, FSR 160, STATUS 168, RTCC etc.

The WB stage 122 performs the write operation to SRAM 182 and writes the ALU result data 224 to SRAM 182.

Figure 3A:
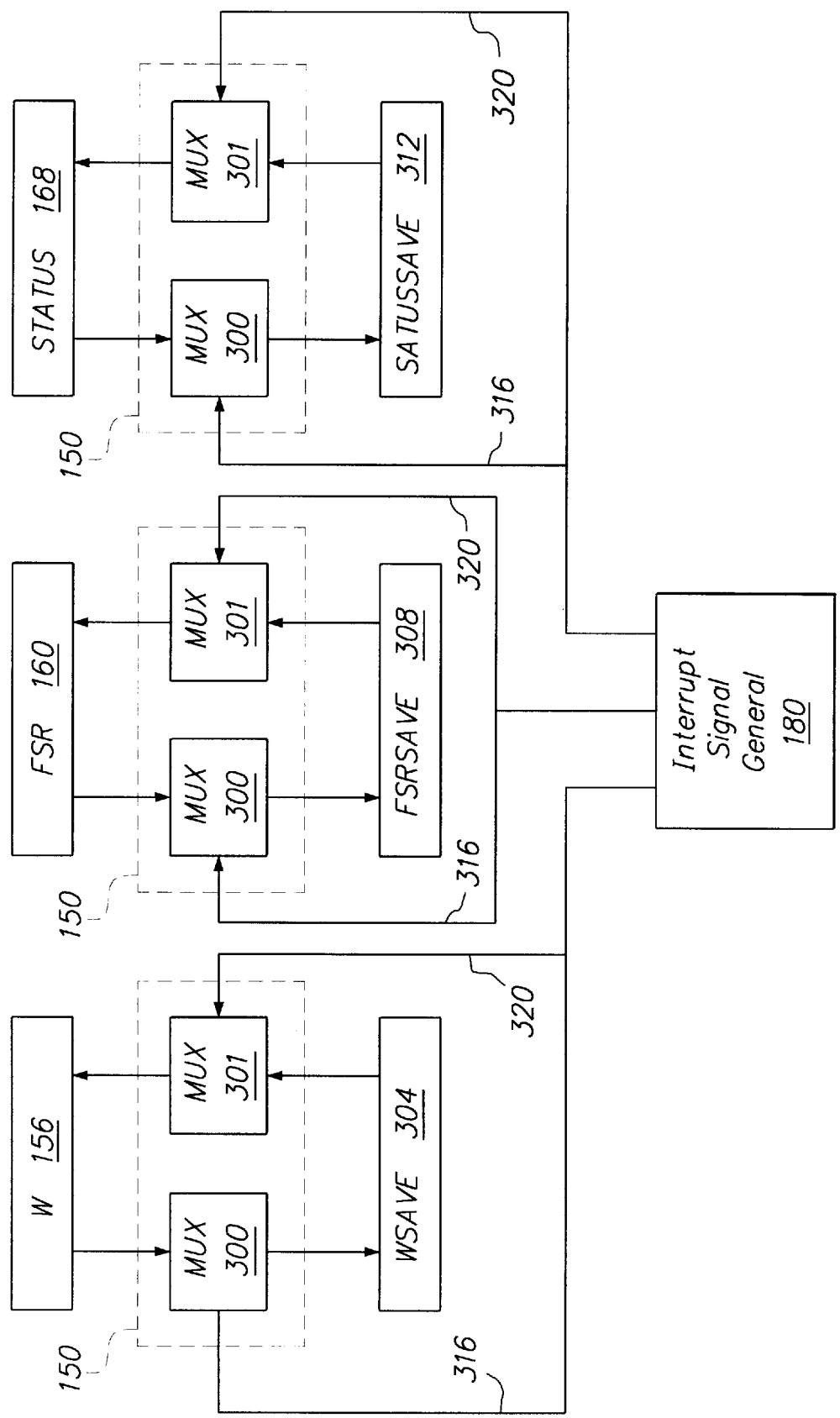
FIG. 3a is a more detailed illustration of the interrupt-handling circuit according to one embodiment of the present invention.

FIG. 3a illustrates in more detail the interrupt handling circuitry according to one embodiment of the present invention. In this embodiment, the contents of the W register 156, the FSR register 160, and the STATUS register 168 are saved in response to receiving an interrupt. Other primary registers 102 may be chosen to be saved; however, the above three registers are typically the most critical and most often used by a main program. Therefore, by transferring the data within these registers 156, 160, 168 to shadow registers 304, 308, 312 automatically, the time required to enter and exit interrupt service routines is reduced.

As shown in FIG. 3a, in this embodiment condition control logic 150 is comprised of two multiplexers 300, 301. The multiplexers 300, 301 are coupled between the primary registers selected to be saved and their corresponding shadow registers. The multiplexers 300, 301 are also coupled to the interrupt signal generator 180, and transfer the data between the two registers responsive to signals generated by the interrupt signal generator 180. For example, for the W register 156, when an interrupt enter signal 316 is generated, the multiplexer 300 transfers the data stored within the W register 156 to the WSAVE shadow register 304. When the interrupt signal generator 180 generates an interrupt exit signal 320, the second multiplexer 301 transfers the data stored within WSAVE 304 to the W register 156, thus restoring the original value of W to the W register 304 upon exiting the ISR. The same circuitry is employed to store the data within the FSR and STATUS registers 308, 312, or any other primary registers 102 which have been selected to be saved.

In FIG. 3b, the condition control logic 150 is illustrated as a simple two nMOS transistor 354, 358 switch circuit. The first transistor 354 receives the interrupt enter signal 316 from the interrupt signal generator 180 at its gate. Thus, when this signal is active, the contents of primary register 102 are transferred to shadow register 104. The second transistor 358 receives the interrupt exit signal 320 at its gate. Thus, when this signal is active, the contents of shadow register 104 are transferred to primary register 102. Of course, a variety of logic circuits to implement the functionality of transferring data from primary register 102 to shadow register 104 responsive to a state of an interrupt signal may be employed within the scope of the present invention. For example, the circuit illustrated in FIG. 7, discussed below, may be used to implement the present invention.

Figure 4:
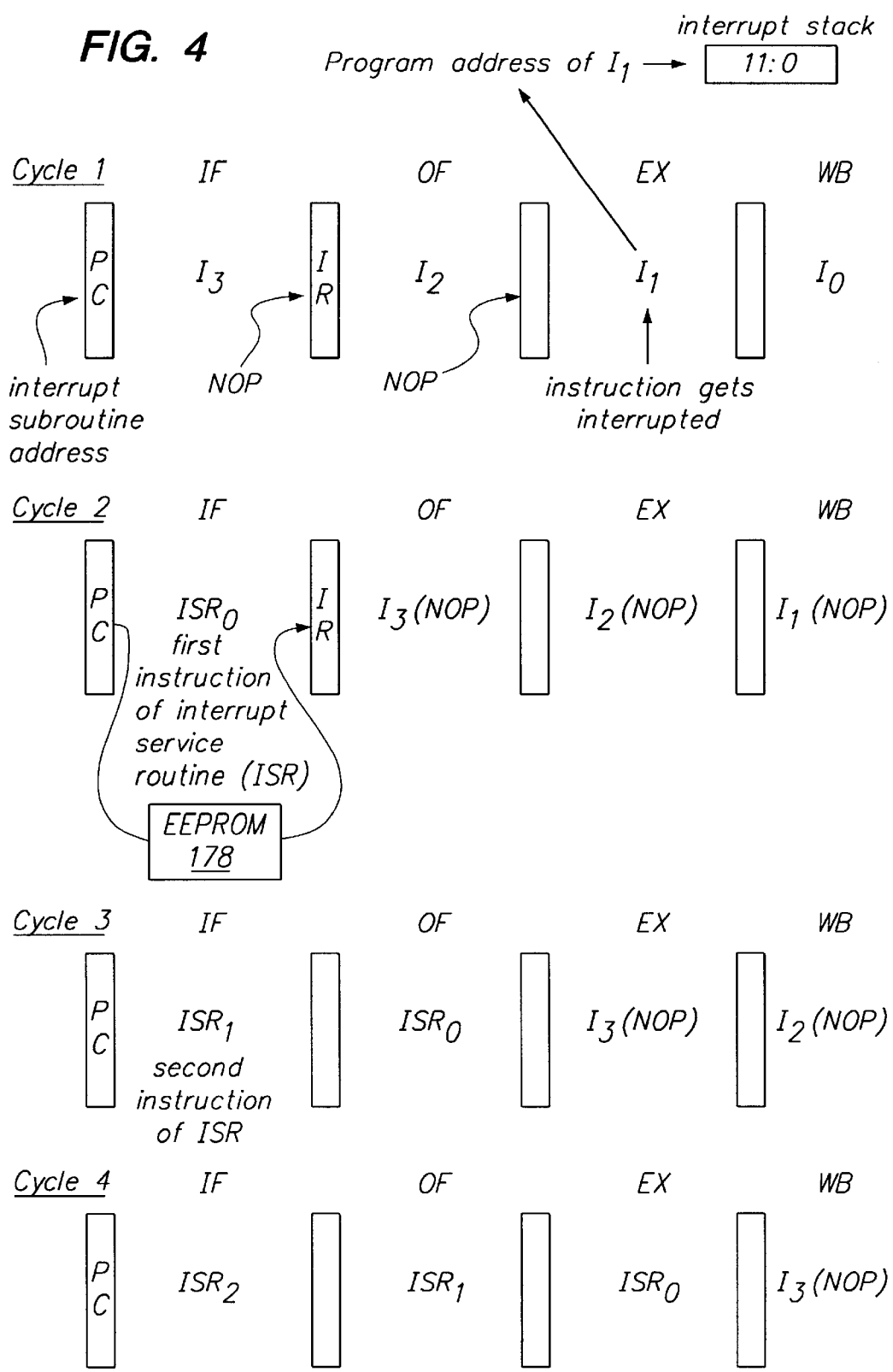
FIG. 4 is a timing diagram of an interrupt operation according to one embodiment of the present invention.
Figure 5:
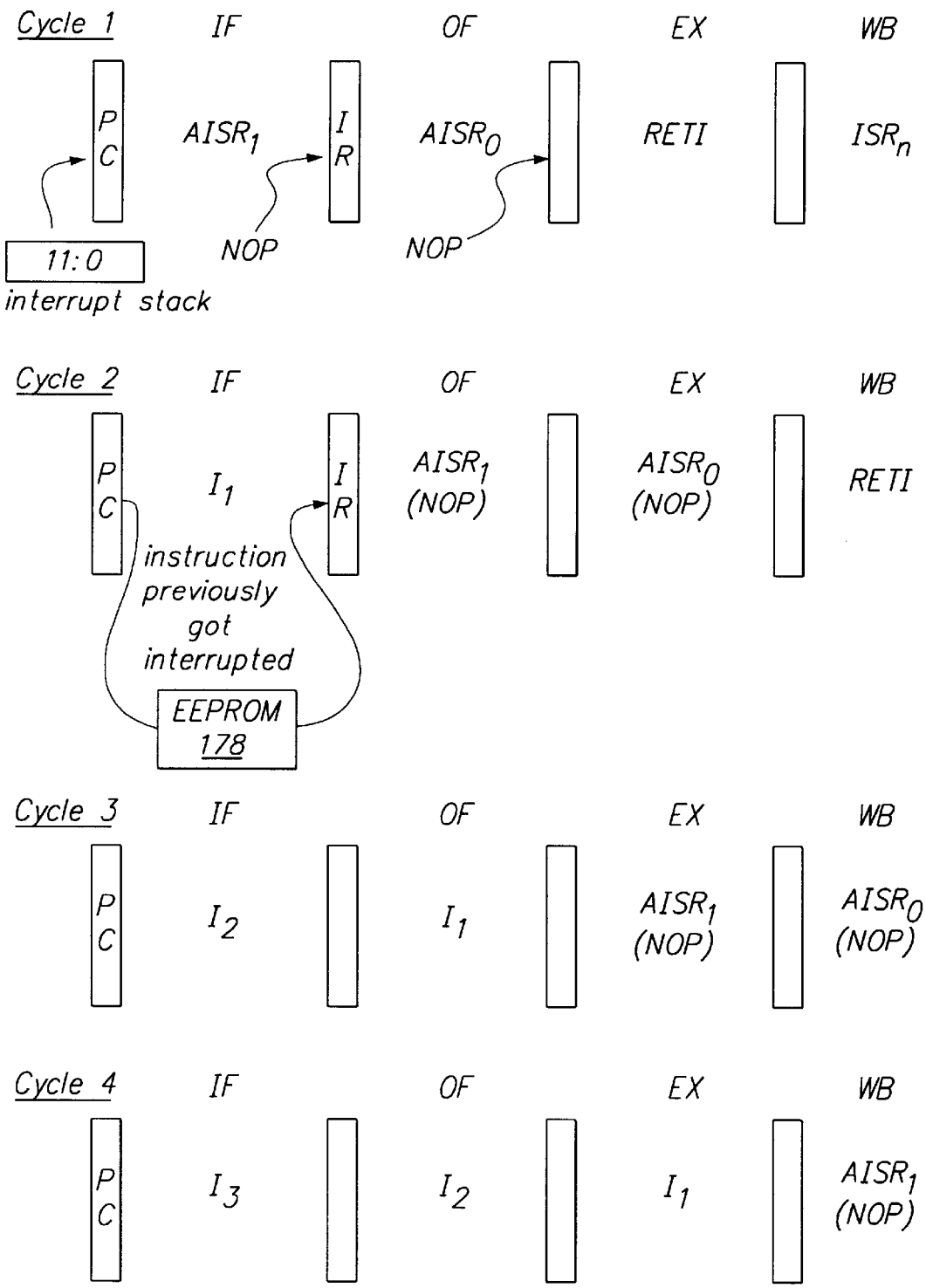
FIG. 5 is a timing diagram of a return from an interrupt service routine according to one embodiment of the present invention.

In FIGS. 4 and 5, a timing diagram illustrates the operation of the interrupt handling program in accordance with the present invention. When the interrupt occurs, the interrupt signal generator 180 initiates the interrupt handling program. In FIG. 4, an interrupt is received when instruction $I_0$ is in pipeline stage WB 122, $I_1$ is in EX 118, $I_2$ is in OF 114, and $I_3$ is in IF 114. Upon receiving the interrupt signal, $I_0$ continues its normal execution. However, $I_1$, $I_2$, and $I_3$ are aborted. The program address of $I_1$ is stored into the interrupt stack. As described above, the values of W, FSR, and STATUS registers 156, 160, 168 are automatically stored into the WSAVE, FSRSAVE, and STATUSSAVE registers 304, 308, 312 respectively. Finally, the program address of the first instruction of the interrupt service routine (ISR) is written into the PC 164. All of the above operations occur within the same system clock, interrupt cycle 1.

For the next clock cycle, cycle 2, the first instruction ($ISR_0$) of the interrupt service routine (ISR) is fetched from the EEPROM 178. In cycle 3, $ISR_0$ moves to the OF stage 114 for preliminary decoding and $ISR_1$ is fetched from the EEPROM 78. In cycle 4, $ISR_0$ is executed in the EX stage 118, $ISR_1$ is in OF 114, and $ISR_2$ is in IF 110. As can be seen, in only 3 clock cycles the first ISR instruction is executed. Thus, by saving all the important states of the microcontroller 100 within one system clock in accordance with the present invention, the ISR does not have to perform context switching (storing the values of W, STATUS, and FSR registers 156, 168, 160) explicitly. This allows the microcontroller 100 to provide extremely fast response to external events. This is much faster than conventional systems which may take 30 to 40 clock cycles prior to executing the first ISR instruction. For example, a microcontroller 100 in a microwave oven designed in accordance with the present invention is able to interrupt the heating of the microwave oven to prevent damage much faster than conventional microcontrollers.

When the ISR has terminated, it executes the instruction "RETI" to return to the interrupted main program. In FIG. 5, the execution of RETI is shown. When the RETI instruction is being executed in the EX stage 118, $AISR_0$ and $AISR_1$ are in the OF stage 114 and the IF stage 110 respectively. AISR instructions are instructions located in memory after the end of the interrupt service routine, and should not be executed. $ISR_n$ and RETI are executed normally but $AISR_0$, and $AISR_1$ are aborted. The program address of $I_1$ is restored back into the PC register 164 from the interrupt stack. The values of W, STATUS, and FSR registers 156, 168, 160 before the execution of $I_1$ are restored back into W 156, FSR 160, and STATUS 168 from WSAVE 304, FSRSAVE 308, and STATUSSAVE 312 respectively, in accordance with FIG. 3a. All of the above events also happen within the same system clock, cycle 1.

For the next clock cycle, cycle 2, the first instruction ($I_1$) of the interrupted main program is fetched from the EEPROM 78. In cycle 3, $I_1$ moves to the OF stage 114 and $I_2$ is fetched from EEPROM 78. In cycle 4, $I_1$ is executed in the EX stage 118, $I_2$ is in the OF stage 114, and $I_3$ is in the IF stage 110. As can be seen, in only three clock cycles the main program (I), is being executed. As described above, since the important states of the microcontroller 100 are restored within one system clock upon returning from interrupt, the ISR does not have to handle the context switching (restoring the values of W, STATUS, and FSR registers 156, 168, 160) explicitly. Thus the time the execution of a main program is interrupted by an external event is minimized.

In FIG. 6, an example of an ISR program in accordance with the present invention is given. Unlike conventional ISR programs, the program does not need to save the values of W 156, FSR 160, and STATUS 168, and thus is able to quickly execute the interrupt service routine. Upon finishing the routine, the values of W 156, FSR 160, and STATUS 168 do not need to be restored, allowing the resumption of the main program to occur with minimal delay.

Figure 7A:
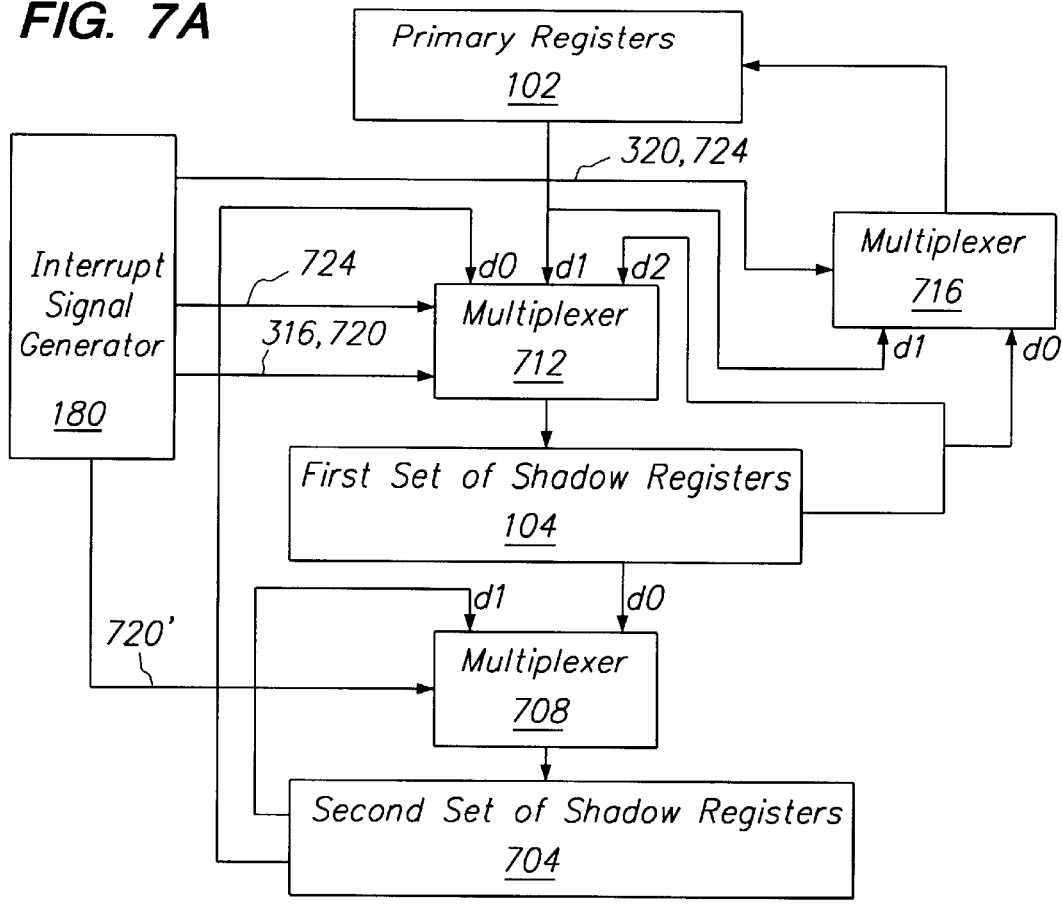
FIG. 7a illustrates an embodiment of the present invention when an interrupt is generated from debugging circuitry.

FIG. 7a illustrates an embodiment of the present invention in which the interrupt signal is generated responsive to the ISD 70. An interrupt generated from ISD 70 occurs for single step breakpoints in the debugging mode of the microcontroller 100. The ISD interrupts occur after the main program has already been interrupted. Thus, the state of the ISR must be saved, as well as the state of the main program. As shown in FIG. 7a, a second set of shadow registers 704 is used to provide this capability. In this embodiment, condition control logic 150 is a three-input multiplexer 712. The three inputs to the multiplexer 712 are: d1, from the primary register 102, d2 from the shadow registers 104, and d3 from the second set of shadow registers 704. The three input multiplexer 712 also receives two select signals, a first select signal is set high when a single step interrupt return 724 occurs, and a second select signal is set high when an interrupt enter signal 316 is transmitted or a single step interrupt signal 720 is transmitted. The single step interrupt signal 720 is generated by the ISG 180 in response to receiving a request for an interrupt from the ISD 70. A single step interrupt return signal 724 is generated by the ISG 180 when the interrupt for the single step interrupt has completed.

Coupled between the second set of shadow registers 704 and the first set of shadow registers 104 is a two-input multiplexer 708. The two inputs of the multiplexer 708 are coupled to the second set of shadow registers 704 and the first set of shadow registers 104. The multiplexer 708 has a select input which is an inverted single step interrupt signal 720. Thus, when the single step interrupt signal 720 is high, the inverted signal 720' is low. The single step interrupt signal 720 is set high upon receiving an interrupt request from the ISD 70.

Coupled between the first set of shadow registers 104 and the primary registers 102 is a two-input multiplexer 716. The first input of the multiplexer 716 is coupled to the primary registers 102. The second input is coupled to the shadow registers 104. The select input of the multiplexer 716 is coupled to the ISG 180 and receives either an inverted interrupt exit signal 320 or an inverted single step return signal 724.

Figure 7B:
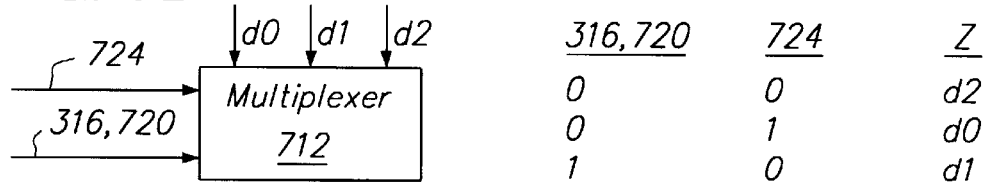
FIG. 7b illustrates the operations of a tri-input multiplexer in one embodiment of the present invention.
Figure 7C:
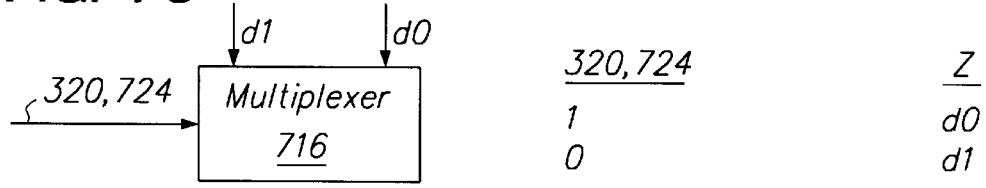
FIG. 7c illustrates the operations of a first dual-input multiplexer in one embodiment of the present invention.
Figure 7D:
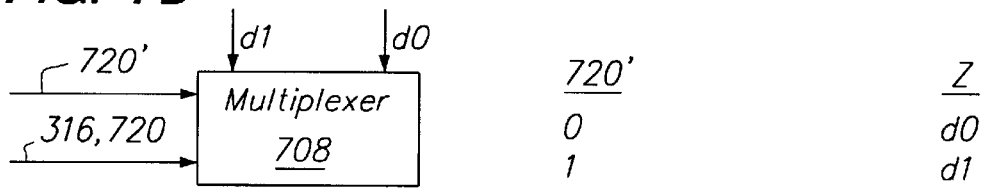
FIG. 7d illustrates the operations of a second dual-input multiplexer in one embodiment of the present invention.

FIG. 7b illustrates the output of the 3-input multiplexer 712. When signals 316, 720, and 724 are low or 0, d2 is selected. When signals 316 or 720 are high or 1, and signal 724 is low or 0, d1 is selected, and when signals 316 or 720 are low and signal 724 is high or 1, d0 is selected. The condition of both select inputs being high cannot occur in this embodiment of the invention. FIG. 7c illustrates the output of the 2-input multiplexer 716. When signals 320 (interrupt exit signal) or 724 (single step return) are 1, d0 is selected. When signals 320 and 724 are zero, d1 is selected. FIG. 7d illustrates the output of the 2-input multiplexer 708. When signal 720' (inverted single step signal) is low, d0 is selected. When signal 720' is high, d1 is selected.

Thus, in operation, upon receiving an interrupt, the data in primary registers 102 are transmitted to the first set of shadow registers 104. This occurs because the interrupt enter signal 316 is high, which selects the data from the primary registers 102 that are coupled to the d1 input of the multiplexer 712. The interrupt enter signal 316 then returns to zero, which selects the data in shadow registers 104 coupled to the d2 input of the multiplexer 712 to be coupled back to the shadow registers 104, effectively recycling the data in the shadow registers 104.

When a single step interrupt signal 720 is received, the data from the shadow registers 104 are coupled to the second set of shadow registers 704. The select signal coupled to the two-input multiplexer 708 is the inverted single step signal 720, and thus, when the single step interrupt signal 720 is high, the inverted signal is low, and selects the output of the first set of shadow registers 104 at d0. Thus, the data from the main program is now saved in registers 704.

When the single step interrupt signal 720 is high, the data from the primary registers 102 are also coupled to the first set of shadow registers 104. This occurs because the single step interrupt signal 720 when high selects the d1 input of the multiplexer 712. This saves the values of the ISR upon an interrupt generated from the debugging program of the ISD 70. Thus, at this point, primary registers 102 are free to store data for the user, the first set of shadow registers 104 hold ISR data, and the second set of shadow registers 704 hold the main program data. As all of this is implemented in hardware on chip, the storing of the data is implemented in one clock cycle.

When the single step return signal 724 is transmitted to multiplexer 712, indicating the end of the debugging interrupt, the. data from the second set of shadow registers 704 are coupled to the first set of shadow registers 104 through the d0 input of the multiplexer 712. At the same time, the data in the first set of shadow registers 104 is coupled to the primary registers 102, through the d0 input of the multiplexer 716. The inputs of the multiplexer 716 are selected by the single step return signal 724. When the single step return 724 is high, the signal 724 selects the d0 input. At this point, the primary registers 102 now store the values for the ISR at the time of interrupt by the ISD 70, and the first set of shadow registers 102 holds the data for the main program. The ISR can resume execution at the point at which it was interrupted, and the primary registers 102 are then free to be used by the ISR to store user data.

When an interrupt return 320 is received, the data in the shadow registers 104 are coupled to the primary registers 102. The inputs of the multiplexer 716 are selected by an interrupt return signal 320. When the interrupt return 320 is high, the d0 input of multiplexer 716 is selected. At this point, the primary registers 102 hold the critical data for the main program prior to receiving the interrupt. As the above processes are accomplished by hardware on chip, restoring the critical data is accomplished in one clock cycle.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. A system for handling interrupts within a microcontroller comprising:

interrupt signal generator logic circuit means for generating an interrupt enter signal responsive to an external event;

means for initiating an interrupt service routine in response to the interrupt enter signal;

pipeline means having a plurality of stages coupled to a memory for processing instructions;

means for coupling a first primary register containing program address data to a corresponding shadow register responsive to receiving the generated interrupt enter signal;

means for coupling a second primary register containing data memory address data to a corresponding shadow register responsive to receiving the generated interrupt enter signal;

means for storing the data in the coupled primary registers into the corresponding shadow registers;

means for decoupling the coupled primary registers from the corresponding shadow registers;

means for coupling a third primary register containing central processing unit status information to a corresponding shadow register responsive to receiving the generated interrupt enter signal;

means for coupling a fourth primary register containing accumulator data to a corresponding shadow register responsive to receiving the generated interrupt enter signal;

interrupt service routine means for entering a first interrupt service routine of an interrupt service routine into the pipeline means responsive to the generated interrupt enter signal;

interrupt signal generator logic circuit means for generating an interrupt exit signal responsive to completion of the interrupt service routine;

responsive to receiving the generated interrupt exit signal, means for coupling the first primary register to the corresponding shadow register;

responsive to receiving the generated interrupt exit program signal, means for coupling the second primary register to the corresponding shadow register;

means for transferring the data in the corresponding shadow registers into the coupled primary registers; and means for decoupling the corresponding registers from the coupled primary registers;

whereby the contents of the primary registers are stored within one clock cycle of the interrupt enter cycle and restored within one clock cycle of the interrupt exit signal.

2. An interrupt handling circuit for a microcontroller, wherein external events occur which require actions to be performed by the microcontroller, comprising:

a program memory having an interrupt service routine including at least one interrupt instruction and a return instruction;

an interrupt signal generator logic circuit, for generating an interrupt enter signal responsive to the occurrence of an external event and an interrupt exit signal responsive to completion of the interrupt service routine;

a plurality of primary registers, each register storing information relating to a current state of the microcontroller;

a plurality of shadow registers, coupled to at least two of the primary registers and the generated interrupt enter and exit signals, for storing the information contained in the coupled primary registers within a first clock cycle subsequent to the interrupt enter signal and restoring the information within one clock cycle of the interrupt exit signal;

an instruction fetch stage, coupled to a program counter register, for retrieving a first interrupt program instruction in a second clock cycle;

an operand fetch stage, for fetching an operand for the first interrupt program instruction in a third clock cycle; and an execution stage, for executing the first interrupt program instruction in a fourth clock cycle;

wherein the execution of the instruction causes an action required by the external event to be performed within a preselected number of clock cycles subsequent to the interrupt enter signal and the information stored on the shadow registers is preserved during the instruction service routine for transference back to the primary registers within one clock cycle subsequent to the interrupt exit signal.

3. An interrupt handling circuit for preserving a current state of a microcontroller, comprising:

an interrupt signal generator logic circuit adapted to intiate an interrupt service routine in response to an interrupt, the interrupt service routine having at least one interrupt instruction stored in a memory and a return instruction, the interrupt signal generator logic circuit generating an interrupt enter signal to initiate the interrupt service routine and an interrupt exit signal responsive to completion of the interrupt service routine;

a plurality of primary registers, each register storing information relating to the current state of the microcontroller;

a plurality of shadow registers;

condition control logic coupling the primary registers and the shadow registers responsive to the signals generated by the interrupt signal generator logic circuit; the condition control logic configured to transfer the information stored in the primary registers into the shadow registers responsive to receiving the interrupt enter signal and to restore the information to the primary registers responsive to the interrupt exit signal; and a pipeline having a plurality of stages coupled to the memory for processing instructions;

wherein the contents of the primary registers are stored into the shadow registers in a single instruction cycle of the microcontroller in response to the interrupt enter signal and a first interrupt instruction of the interrupt service routine is fed into the pipeline in a second instruction cycle.

4. An interrupt handling circuit for preserving a current state of a microcontroller, comprising:

a program memory for storing an interrupt service routine having at least one interrupt instruction and a return instruction;

an interrupt signal generator logic circuit, the interrupt signal generator logic circuit producing an interrupt enter signal to initiate the interrupt service routine and an interrupt exit signal responsive to completion of the interrupt service routine;

a plurality of primary registers, each register storing information relating to the current state of the microcontroller;

a plurality of shadow registers;

condition control logic coupling the primary registers and the shadow registers in response to the signals generated by the interrupt signal generator logic circuit; the condition control logic configured to transfer the information stored in the primary registers into the shadow registers responsive to receiving the interrupt enter signal and to restore the information to the primary registers responsive to the interrupt exit signal;

an instruction fetch stage, coupled to a program counter register, for retrieving a first interrupt program instruction from the memory in a second clock cycle subsequent to the interrupt enter signal;

an operand fetch stage, for fetching an operand for the first interrupt program instruction from the memory in a third clock cycle subsequent to the interrupt enter signal; and an execution stage, for executing the first interrupt program instruction in a fourth clock cycle subsequent to the interrupt enter signal, wherein the execution of the instruction causes an action required by the external event to be performed within a preselected number of clock cycles after the interrupt enter signal and the information relating to the state of the microcontroller is restored to the primary registers upon completion of the interrupt service routine.

\* \* \* \* \*